(12) United States Patent
Botman et al.

(10) Patent No.: US 11,720,619 B2
(45) Date of Patent: Aug. 8, 2023

(54) FILTERING BASED ON A RANGE SPECIFIER

(71) Applicant: Arm Limited, Cambridge (GB)

(72) Inventors: François Christopher Jacques Botman, Cambridge (GB); Thomas Christopher Grocutt, Cambridge (GB); Bradley John Smith, Haverhill (GB)

(73) Assignee: Arm Limited, Cambridge (GB)

( * ) Notice: Subject to any disclaimer, the term of this patent is extended or adjusted under 35 U.S.C. 154(b) by 152 days.

(21) Appl. No.: 17/098,815

(22) Filed: Nov. 16, 2020

(65) Prior Publication Data

US 2022/0156301 A1  May 19, 2022

(51) Int. Cl.
  *G06F 16/35* (2019.01)
  *G06F 16/33* (2019.01)
  *G06F 16/335* (2019.01)

(52) U.S. Cl.
  CPC .......... *G06F 16/355* (2019.01); *G06F 16/335* (2019.01)

(58) Field of Classification Search
  CPC .................................................. G06F 16/355
  See application file for complete search history.

(56) References Cited

U.S. PATENT DOCUMENTS

| | | | | |
|---|---|---|---|---|
| 4,961,162 A * | 10/1990 | Nguyenphu | ..........  | G06F 9/3822 712/E9.046 |
| 5,528,741 A * | 6/1996 | Lucas | ..................... | H03M 7/24 345/593 |
| 11,227,641 B1 * | 1/2022 | Ramesh | .................... | G11C 7/06 |
| 2003/0084375 A1 * | 5/2003 | Moore | .................. | G06F 11/362 710/266 |
| 2009/0182795 A1 * | 7/2009 | Dobbek | .................. | H03M 7/24 708/209 |
| 2018/0364980 A1 * | 12/2018 | Arulraj | ............... | H03M 7/3091 |

OTHER PUBLICATIONS

Kwon, Albert, et al. "Low-fat pointers: compact encoding and efficient gate-level implementation of fat pointers for spatial safety and capability-based security." Proceedings of the 2013 ACM SIGSAC conference on Computer & communications security. 2013. (Year: 2013).*

Ruwase, Olatunji, and Monica S. Lam. "A Practical Dynamic Buffer Overflow Detector." NDSS. vol. 2004. 2004. (Year: 2004).*

(Continued)

*Primary Examiner* — Mohsen Almani

(74) *Attorney, Agent, or Firm* — Nixon & Vanderhye P.C.

(57) ABSTRACT

Data processing apparatuses, methods and computer programs are disclosed. A range definition register is arranged to store a range specifier and filtering operations are performed with respect to a specified transaction by reference to the range definition register. The range definition register stores the range specifier in a format comprising a significand and an exponent, wherein a range of data identifiers is at least partially defined by the range specifier. When the specified transaction is with respect to a data identifier within the range of data identifiers, the filtering operations performed are dependent on attribute data associated with the range of data identifiers.

20 Claims, 8 Drawing Sheets

(56) References Cited

OTHER PUBLICATIONS

Shirazi, Nabeel, Al Walters, and Peter Athanas. "Quantitative analysis of floating point arithmetic on FPGA based custom computing machines." Proceedings IEEE Symposium on FPGAs for Custom Computing Machines. IEEE, 1995. (Year: 1995).*
Muscedere, Roberto, et al. "Efficient techniques for binary-to-multidigit multidimensional logarithmic number system conversion using range-addressable look-up tables." IEEE Transactions on Computers 54.3 (2005): 257-271. (Year: 2005).*
Woodruff et al., "CHERI Concentrate: Practical Compressed Capabilities", IEEE Transactions On Computers, 68 (10), Apr. 2019, pp. 1455-1469.
Robert Bedichek, "Some Efficient Architecture Simulation Techniques," Proceedings of the Winter 1990 USENIX Conference, Jan. 22-26, 1990, 12 pages.
International Search Report and Written Opinion of the International Searching Authority for PCT/GB2021/052397 dated Dec. 8, 2021, 14 pages.
Infineon Technologies, "TriCore™ V1.6 Core Architecture 32-bit Unified Processor Core User Manual (vol. 1)", May 2012.
Texas Instruments, "Multicore Fixed and Floating-Point Digital Signal Processor" TMS320C6678, Mar. 2014, 247 pages.
STMicroelectronics, "PM0214 Programming manual, STM32 Cortex®-M4 MCUs and MPUs programming manual" Mar. 2020, pp. 1-262.
T. Chen et al, "Pointer Tagging for Memory Safety" retrieved from https://www.microsoft.com/en-us/research/uploads/prod/2019/07/Pointer-Tagging-for-Memory-Safety.pdf, retrieved on Nov. 24, 2021, 23 pages.

* cited by examiner

| 31 | 29 | 28 | 22 | 21 | 20 | 19 | 18 | 17 | 16 | 15 | 14 | 9 | 8 | 0 |
|---|---|---|---|---|---|---|---|---|---|---|---|---|---|---|
| PERMS | | METADATA | | SH | | AP | | XN | I | L | T | | B | |

FILTERING BASED ON A RANGE SPECIFIER

This invention was made with Government support under Contract Number HR001118C0016 awarded by the Defense Advanced Research Projects Agency (DARPA). The Government has certain rights in this invention.

TECHNICAL FIELD

The present disclosure relates to data processing. In particular, the present disclosure relates to filtering operations based on a range specifier.

DESCRIPTION

A data processing apparatus may comprise filtering circuitry to perform filtering operations with respect to certain transactions within the apparatus. When configured to do this, it may be required for at least some of the filtering to only be applied to a certain subset of the transactions, for example those transactions which are with respect to a specified range of memory addresses or which are with respect to a specified range of data values.

SUMMARY

In one example embodiment described herein there is a data processing apparatus comprising:
a range definition register arranged to store a range specifier; and
filtering circuitry to perform filtering operations with respect to a specified transaction by reference to the range definition register,
wherein the range definition register is arranged to store the range specifier in a format comprising a significand and an exponent, wherein a range of data identifiers is at least partially defined by the range specifier,
and, when the specified transaction is with respect to a data identifier within the range of data identifiers, the filtering operations performed by the filtering circuitry are dependent on attribute data associated with the range of data identifiers.

In one example embodiment described herein there is a method comprising:
storing a range specifier in a range definition register;
performing filtering operations with respect to a specified transaction by reference to the range definition register,
wherein the range definition register is arranged to store the range specifier in a format comprising a significand and an exponent, wherein a range of data identifiers is at least partially defined by the range specifier; and
when the specified transaction is with respect to a data identifier within the range of data identifiers, modifying the filtering operations in dependence on attribute data associated with the range of data identifiers.

In one example embodiment described herein there is a computer program for controlling a host data processing apparatus to provide an instruction execution environment comprising:
range definition register logic arranged to store a range specifier; and
filtering logic to perform filtering operations with respect to a specified transaction by reference to the range definition register logic,
wherein the range definition register is arranged to store the range specifier in a format comprising a significand and an exponent, wherein a range of data identifiers is at least partially defined by the range specifier,
and, when the specified transaction is with respect to a data identifier within the range of data identifiers, the filtering operations performed by the filtering logic are dependent on attribute data associated with the range of data identifiers.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1A:
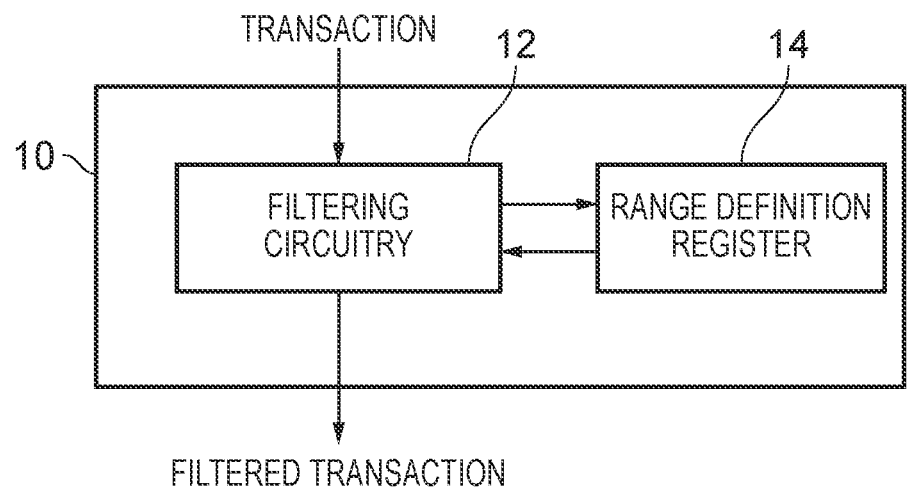
FIG. 1A schematically illustrates an apparatus in accordance with example embodiments.

Before discussing the embodiments with reference to the accompanying figures, the following description of embodiments is provided.

In accordance with one example configuration there is provided a data processing apparatus comprising:
a range definition register arranged to store a range specifier; and
filtering circuitry to perform filtering operations with respect to a specified transaction by reference to the range definition register,
wherein the range definition register is arranged to store the range specifier in a format comprising a significand and an exponent, wherein a range of data identifiers is at least partially defined by the range specifier,
and, when the specified transaction is with respect to a data identifier within the range of data identifiers, the filtering operations performed by the filtering circuitry are dependent on attribute data associated with the range of data identifiers.

A range of data identifiers, such as a range of memory addresses or a range of data values, is generally defined by the limits of that range (e.g. a starting value and an end value), where it is implicit that data identifiers which fall between the limits of the range form a set which satisfy a predetermined condition. For example certain data processing operations may be applied (or not applied) only when a subject data identifier is within the range. Thus for a data processing apparatus which is provided with a range definition register arranged to store a range specifier, conventionally that range specifier might provide a value representing a limit of the range (for example an upper limit, where a lower limit is specified elsewhere or assumed). However the present techniques recognise that a configuration in which a range definition register holds a range specifier in this format lacks flexibility. Furthermore, bit space is often at a premium within a register of a data processing apparatus.

In this context the present techniques provide a configuration in which a range definition register is arranged to store a range specifier in a format comprising a significand and an exponent. In other words the range definition register holds the range specifier in a floating-point format having a fixed set of digits (the significand) to which a scaling is applied (using the exponent). This scaling thus makes use of the exponent in a given base, such that the scaling factor is $base^{exponent}$. For ease of implementation in the context of the data processing apparatus this base may for example be two. The range of data identifiers is then at least partially defined by the range specifier in this floating-point format. This provides useful elements of flexibility in the manner in which the range of data identifiers is defined, where the precision with which a range of data identifiers is specified can be traded off against the size of the range specified. Smaller ranges (defined using smaller exponents) can be precisely defined, for example down to the level of individual data identifiers, whereas larger ranges may require groupings of data identifiers to be considered (e.g. blocks of memory in the case of memory addresses—a variety of memory alignment), but can specify larger ranges than might otherwise be possible under the constraint of the limited number of encoding bits to represent this range.

The filtering circuitry can thus make use of the range specifier to identify transactions which are being made with respect to data identifiers which fall within the defined range, having constructed the range from the significand and the exponent of the range specifier stored in the range definition register. The filtering operations performed by the filtering circuitry are further dependent on attribute data associated with the range of data identifiers. This attribute data may be variously defined and definitions of that attribute data may be variously held, but in some embodiments the range specifier further comprises at least some of the attribute data. Indeed the flexibility provided by the present techniques in defining the range specifier with respect to the significand and the exponent, within the space-constrained environment of the range definition register, can allow a greater proportion of the bits of the range definition register to be used to define attribute data for the defined range of data identifiers.

As mentioned above, the definition of a range of data identifiers may comprise a lower (or upper) limit which is assumed or separately defined, such that the range may be constructed by reference to that reference (upper or lower) limit and the range size given by the range specifier stored in the range definition register. In some embodiments the data processing apparatus further comprises a base definition register arranged to store a base specifier, wherein the range of data identifiers comprises a set of data identifiers ranging between a first data identifier indicated by the base specifier and a second data identifier dependent on the first data identifier and a data identifier range indicated by the range specifier.

Further, the attribute data may, at least in part, be defined by that base specifier and in some embodiments the base specifier further comprises at least some of the attribute data.

The present techniques may find applicability for various data identifiers where a range of those data identifiers is to be defined. However in some embodiments the range definition register is a memory region range definition register and the range specifier is a memory region range specifier, and wherein the range of data identifiers is a memory region at least partially defined by the memory region range specifier. Accordingly the present techniques enable notable flexibility in the definition of a memory range to which filtering operations are to be applied. The definition of a memory range with reference to the significand and exponent of the memory region range specifier provides that memory ranges covering only a small number of memory addresses up to memory ranges covering large sections of memory can be defined.

The memory region range specifier may be used in a variety of ways to define the range of memory addresses, but in some embodiments the data processing apparatus further comprises a memory region base definition register arranged to store a memory region base specifier, wherein the memory region comprises a set of memory addresses ranging between a first address indicated by the memory region base specifier and a second address dependent on the first address and a memory range indicated by the memory region range specifier.

The memory region which is at least partially defined by the memory region range specifier may in some examples be relatively static, such that the filtering circuitry is configured to perform its filtering operations only with respect to that memory region. However, in other examples, the memory region range specifier may be updated in dependence on the memory addresses which are being accessed. For example in some embodiments the filtering circuitry is responsive to the specified memory access, when the memory region does not correspond to the specified memory access, to perform a memory region specifier lookup procedure to seek to retrieve replacement content for the memory region range definition register and the memory region base definition register corresponding to the specified memory access. This configuration enables the apparatus to hold different sets of attribute data each associated with a different defined memory region. When a number of memory accesses are made to a defined region of memory covered by the memory region range definition, the same attribute data can be referenced to filter those memory accesses, for example to define certain areas of memory as read-only, as restricted to allow access only by certain agents, as allowing/forbidding execution of instructions stored therein, and so on. As such a memory region range specifier in the memory region range definition register (possibly in combination with a memory region base specifier in a memory region base definition register) may be applicable for an ongoing set of memory accesses, for example where a given processing agent accesses a certain portion of memory for a given type of processing task. However, when access is then made to a different region of memory (falling outside the memory region range definition), this lookup procedure can then retrieve replacement content for the memory region range definition register, such that in particular a new set of attribute data can then be referenced for the new memory access and for which different rules can then be applied.

The memory region specifier lookup procedure may be carried out in a variety of ways, but in some embodiments performing the memory region specifier lookup procedure comprises performing a table walk with respect to a table of memory region specifiers stored in memory, wherein the table walk is a converging iterative process comprising examination of a sequence of candidate memory region base specifiers, wherein at each iteration of the converging iterative process a comparison is made between a candidate memory region base specifier and the memory address of the specified memory access, wherein for a subsequent iteration of the converging iterative process the candidate memory region base specifier is dependent on a result of the comparison in a preceding iteration of the converging iterative process. Accordingly, the iterative process references the base specifier values, using them to inform the next iteration of the process. As such a search is performed which is guided by the base values. For example, at each iteration a determination may be made as to whether the base value is greater than or less then the address of the memory access being handled and the required memory region base specifier can thus be homed in on. The memory region range specifier then need only be examined (and the range constructed from the significand and the exponent), once base specifier is considered suitable close to the address of the memory access.

Consequently, in some embodiments the table walk further comprises a verification step performed after the converging iterative process to determine whether the candidate memory region base specifier of a final iteration of the converging iterative process and a candidate memory range indicated by a candidate memory region range specifier define a candidate memory region comprising the memory address of the specified memory access.

The examination of the memory region range specifier may however be interleaved as part of the steps of the iterative process and in some embodiments performing the memory region specifier lookup procedure comprises performing a table walk with respect to a table of memory region specifiers stored in memory, wherein the table walk is a converging iterative process comprising examination of a sequence of candidate memory region base specifiers, wherein in a first step of each iteration of the converging iterative process a candidate first address is determined from each candidate memory region base specifier and, when the candidate first address represents a boundary of a candidate memory region which is compatible with the specified memory access, a second step of each iteration is performed to determine whether the candidate first address and a candidate memory range indicated by a candidate memory region range specifier define a candidate memory region comprising the memory address of the specified memory access.

The separate definition of a memory region base specifier and a memory region range specifier as distinct items to be retrieved from memory allows further variation in the manner and ordering in which these two information items are handled. For example in some embodiments the first step of each iteration of the converging iterative process comprises fetching the candidate memory region base specifier and the candidate memory region range specifier from the table in memory, and, when the second step of each iteration is performed, the second step of each iteration is performed contemporaneously with a next first step of a next iteration of the converging iterative process comprising fetching a next candidate memory region base specifier and a next candidate memory region range specifier from the table in memory. This parallelisation may allow a faster retrieval of the required memory region range specifier and memory region base specifier.

The data identifiers may take other forms than memory addresses and in some embodiments the range definition register is a data value range definition register and the range specifier is a data value range specifier, and wherein the range of data identifiers is a range of data values at least partially defined by the data value range specifier. Accordingly the filtering operations may therefore be performed on the basis of a range of data values defined, and whether a given transaction comprises a data value falling within that defined range of data values.

The data processing apparatus which supports the present techniques may be configured in a variety of ways but in some embodiments further comprises:

processing circuitry to perform data processing operations;

at least one capability register arranged to store at least one capability pointer;

decode circuitry responsive to a sequence of instructions to generate control signals for the processing circuitry to cause the processing circuitry to perform the data processing operations in accordance with the sequence of instructions, wherein the data processing instructions comprise at least one capability pointer processing instruction, wherein in response to the at least one capability pointer processing instruction specifying the at least one capability register the processing circuitry performs at least one capability pointer specific data processing operation with respect to the at least one capability register, and wherein the range definition register is a capability register.

Accordingly in a data processing apparatus which is arranged to perform data processing with respect to at least one capability register holding at least one capability pointer, the present techniques may take advantage of that configuration to allow the range specifier held in the range definition register to be handled as a capability pointer. This then enables the mechanisms of the apparatus which process such capability pointers (or "fat pointers") to be applied to the memory range definitions, in particular with the enhanced security provisions associated with such capability pointers. Improved memory region definition security is thus supported.

Various aspects of the capability processing features of such a data processing apparatus may be made use of in this way. In some such example embodiments the data processing instructions comprise a capability pointer generating instruction, wherein the decode circuitry is responsive to the capability pointer generating instruction, when the capability pointer generating instruction specifies the range definition register as a destination register, to cause the processing circuitry to generate the range specifier.

The attribute data may be used is a variety of ways to modify the filtering operations performed, but in some embodiments the filtering circuitry is memory protection circuitry and the filtering operations with respect to the specified memory access comprise preventing the specified memory access from accessing the memory address when the attribute data associated with the memory region indicate that access to the memory address is forbidden.

In some embodiments the filtering circuitry is monitoring circuitry and the filtering operations with respect to the specified transaction comprise generating a notification when the attribute data associated with the memory region indicate that access to the memory address is to be subject to monitoring actions.

In some embodiments the monitoring circuitry is debug circuitry and the filtering operations with respect to the specified transaction comprise debug operations.

In some embodiments the monitoring circuitry is trace circuitry and the filtering operations with respect to the specified transaction comprise tracing operations.

In some embodiments the monitoring circuitry is watchpoint circuitry and the filtering operations with respect to the specified transaction comprise watchpoint operations.

In accordance with one example configuration there is provided a method comprising:

storing a range specifier in a range definition register;

performing filtering operations with respect to a specified transaction by reference to the range definition register, wherein the range definition register is arranged to store the range specifier in a format comprising a significand and an exponent, wherein a range of data identifiers is at least partially defined by the range specifier; and when the specified transaction is with respect to a data identifier within the range of data identifiers, modifying the filtering operations in dependence on attribute data associated with the range of data identifiers.

In accordance with one example configuration there is provided a computer program for controlling a host data processing apparatus to provide an instruction execution environment comprising:

range definition register logic arranged to store a range specifier; and filtering logic to perform filtering operations with respect to a specified transaction by reference to the range definition register logic, wherein the range definition register is arranged to store the range specifier in a format comprising a significand and an exponent, wherein a range of data identifiers is at least partially defined by the range specifier, and, when the specified transaction is with respect to a data identifier within the range of data identifiers, the filtering operations performed by the filtering logic are dependent on attribute data associated with the range of data identifiers.

Particular embodiments will now be described with reference to the figures.

Figure 1B:
FIG. 1B schematically illustrates a range specifier in accordance with example embodiments.
Figure 1C:
FIG. 1C schematically illustrates a range specifier in accordance with example embodiments.

FIG. 1A illustrates a data processing apparatus 10 in accordance with some embodiments. The apparatus 10 comprises filtering circuitry 12, which has access to a range definition register 14. The filtering circuitry 12 receives a transaction as part of the data processing operations performed by the wider data processing system of which the apparatus illustrated forms part. The filtering circuitry 12 is arranged to modify the filtering operations which it performs with respect to the transactions it handles on the basis of a data identifier forming part of the transaction and a range of data identifiers at least partially specified by the content of the range definition register. The range definition register 14 is arranged to store a range specifier, example formats of which are shown in FIGS. 1B and 1C. Notably the range specifier comprises two parts: an exponent and a significand. Together the exponent and significand of the range specifier define a range of data identifiers in a floating-point format, i.e. where the value defined by the significand is scaled using the exponent (applied to an assumed base value). FIG. 1C schematically illustrates the content of the range specifier in some embodiments where it can be seen to comprise not only the exponent and the significand but also a set of attributes. The filtering circuitry 12 of the apparatus 10 makes use of the attribute data in the filtering operations it performs, where the relevant attribute data associated with the range of data identified are defined at least partly by the content of the range definition register 14. Accordingly, in an example embodiment in which the range specifier is configured as shown in FIG. 1B, the attribute data is defined elsewhere (or implied), but in embodiments with a range specifier configured as shown in FIG. 1C, at least some of the attribute data is provided within the range definition register 14.

Figure 2A:
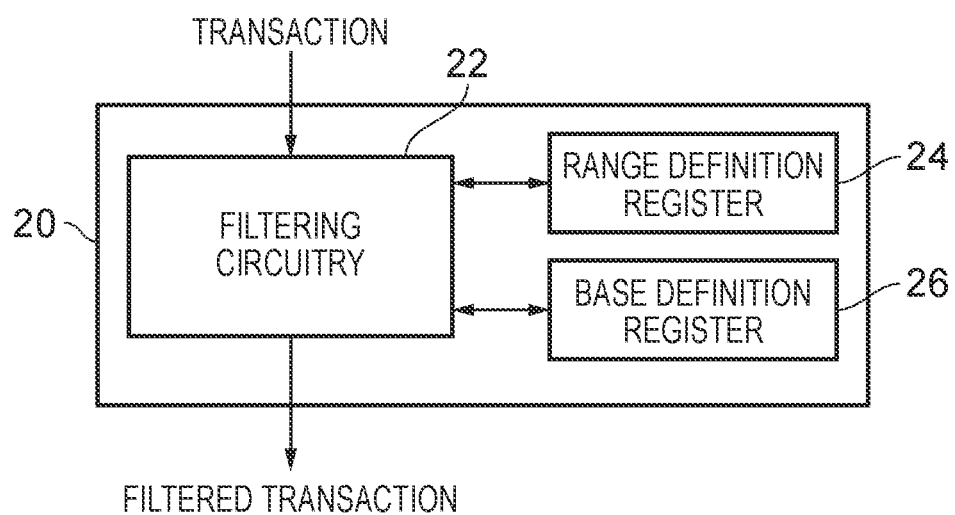
FIG. 2A schematically illustrates an apparatus in accordance with example embodiments.
Figure 2B:
FIG. 2B schematically illustrates a base specifier in accordance with example embodiments.

FIG. 2A schematically illustrates apparatus 20 in some example embodiments. The apparatus 20 comprises filtering circuitry 22, range definition register 24 and base definition register 26. The filtering circuitry 22 has access to the range definition register 24 and the base definition register 26. In performing its filtering operations with respect to transactions it handles, the filtering circuitry 22 determines whether a data identifier specified by the transaction falls within a range of data identifiers defined by the content of the range definition register 24 and the base definition register 26. More specifically, the base definition register 26 holds a base specifier, whilst the range definition register 24 holds a range specifier and the combination of the two provides the definition of the range of data identifiers. For example, the base specifier may define a numerically smallest data identifier, whilst the range specifier defines a set of data identifiers beginning at that base value. FIG. 2B schematically illustrates a base specifier in some embodiments, where the base specifier comprises a base value and a set of attributes. The attributes are not an essential part of the base specifier and, as in the manner of the range specifier of FIG. 1B, a base specifier may also be defined comprising no attributes. On the other hand, both the base specifier and the range specifier may comprise at least some attribute data and the filtering circuitry 22 can bring these together to form a full definition of the attribute data which is to be applicable to the defined range.

Figure 3A:
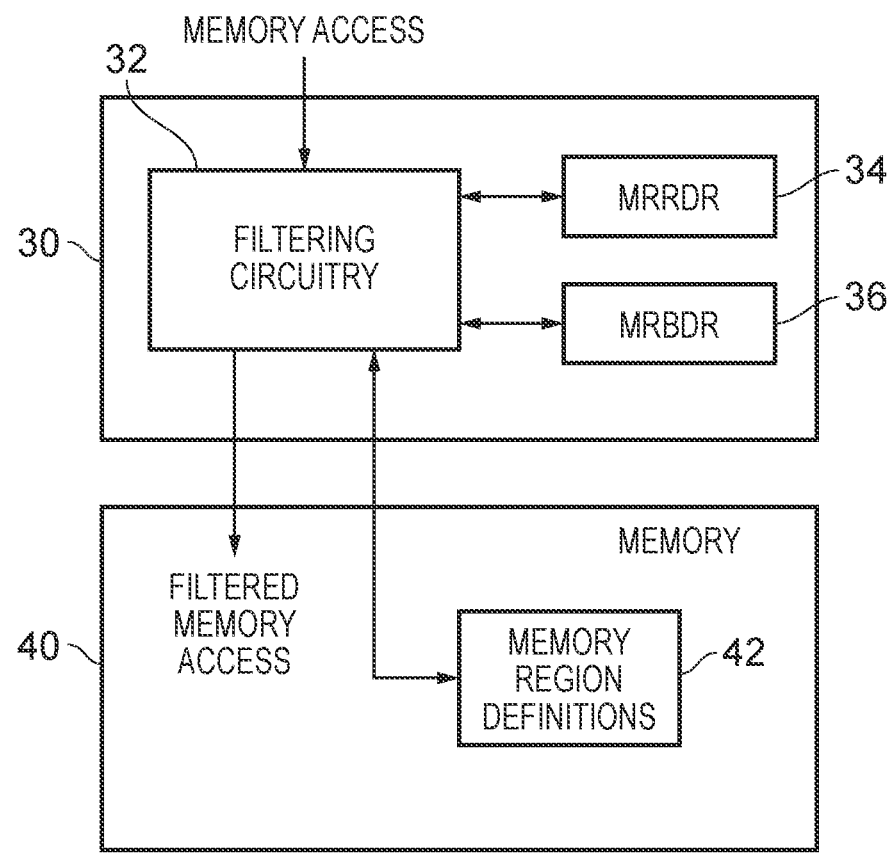
FIG. 3A schematically illustrates an apparatus in accordance with example embodiments.
Figure 3B:
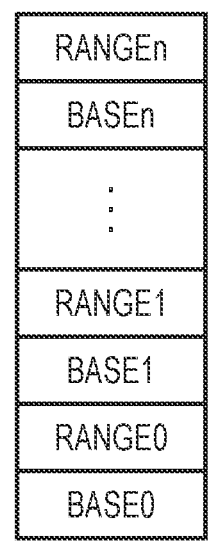
FIG. 3B schematically illustrates memory region base specifier and range specifier pairs stored in a table in memory in accordance with example embodiments.

The data identifiers may take various forms, for example memory addresses or data values. FIG. 3A schematically illustrates a data processing apparatus according to some embodiments where the data identifiers are memory addresses. The apparatus 30 comprises filtering circuitry 32 which filters transactions which comprise memory accesses. The filtering circuitry 32 comprises memory region range definition register (MRRDR) 34 and memory region base definition register (MRBDR) 36. The apparatus 30 lies on the path which the memory accesses takes en route to memory 40. So positioned, the apparatus 30 plays the role of a protection device, ensuring that memory accesses to the memory 40 are in accordance with defined rules within this data processing system. When a memory access transaction is received by the filtering circuitry 32 it determines whether the memory address which is the subject of the memory access lies within the memory region defined by the current content of the MRRDR 34 and the MRBDR 36. When this is the case, the filtering circuitry further determines whether the memory access complies with rules defined by attribute data associated with that defined memory region. This attribute data could be separately provided, but in this example embodiment is provided as part of the content of the MRRDR 34 and the MRBDR 36. Nevertheless the filtering circuitry 32 is not constrained only to perform filter operations with respect to one defined memory region. For this purpose substitute content of the MRRDR register 34 and the MRBDR register 36 is stored in memory 40 in the form of further memory region definitions 42. In particular, when the filtering circuitry 32 handles a memory access request which does not fall within the memory region defined by the current content of the two registers, it can access the memory region definitions 42 in the memory 40 in order to retrieve the corresponding memory region definition (assuming it is there), such that appropriate attribute data can define the filtering operations performed by the filtering circuitry 32 with respect to this memory access. The memory region definitions 42 are stored in a tabular form in memory 40 and may be freely defined to comprise any possible subdivision of the accessible memory space. For example in one extreme there might only be one memory region defined (possibly covering the entirety of the available memory space), whereas at the other extreme there might be a large number of different memory regions defined, each comprising a small set of memory addresses. As a result of this flexibility in the definition of the memory regions, the filtering circuitry does not know in advance where to find the memory region specifiers it requires. Consequently the filtering circuitry is arranged to perform an iterative lookup procedure (a table walk) in order to find the required memory region specifiers. The memory region range specifier and the memory region base specifier are stored in association with one another, since only when taken in combination do they define their memory region. FIG. 3B schematically illustrates memory region base specifier and range specifier pairs stored in a table in memory in some example embodiments. Whilst in some examples both the memory region range specifier and the memory region base specifier are retrieved at each step, in this example a memory region base specifier is first accessed. It can then be determined whether the current memory address of the current memory access is compatible with that memory region base specifier. For example, when the memory region base specifier gives a numerically lowest memory address in a given memory region definition, a determination of whether the current memory address is less than or greater than the base specifier shows whether this memory region definition is even a candidate to further consider. To be clear, when the memory region base specifier gives a numerically lowest memory address in the region, if the current memory address is less than that memory region base specifier, this cannot be the required memory region definition. Further constraints may also rule out other candidate memory region definitions, for example if memory region definitions are constrained to have a maximum size, if the current memory address differs from the memory region base specifier by more than that size, this also cannot be the required memory region definition. When a memory region base specifier is found which is potentially applicable to the current memory address, the memory region range specifier can be examined to determine if the memory region range specifier and the memory region base specifier together define a memory region which encompasses the current memory address. This examination of the memory region range specifier may be immediate if the memory region range specifier has been retrieved in parallel with the memory region base specifier, or may be at a next iteration step if the memory region range specifier is only retrieved once a valid candidate memory region base specifier is found. The retrieval of the memory region range specifiers and the memory region base specifiers can be offset with respect to one another, where a next candidate memory region base specifier is retrieved in parallel with a current candidate memory region range specifier, to amortize the retrieval latency. At a last iteration the current candidate memory region range specifier is found to be correct and the next memory region base specifier, retrieved in parallel, is discarded. Thus, so long as the required memory region base specifier/range specifier pair has not been found, for example because the range does not extend far enough to cover the current memory address, then the iterative lookup procedure continues. The address space may for example be examined by iterative division in half to home in on the required memory region definition.

Figures 4A, 4B:
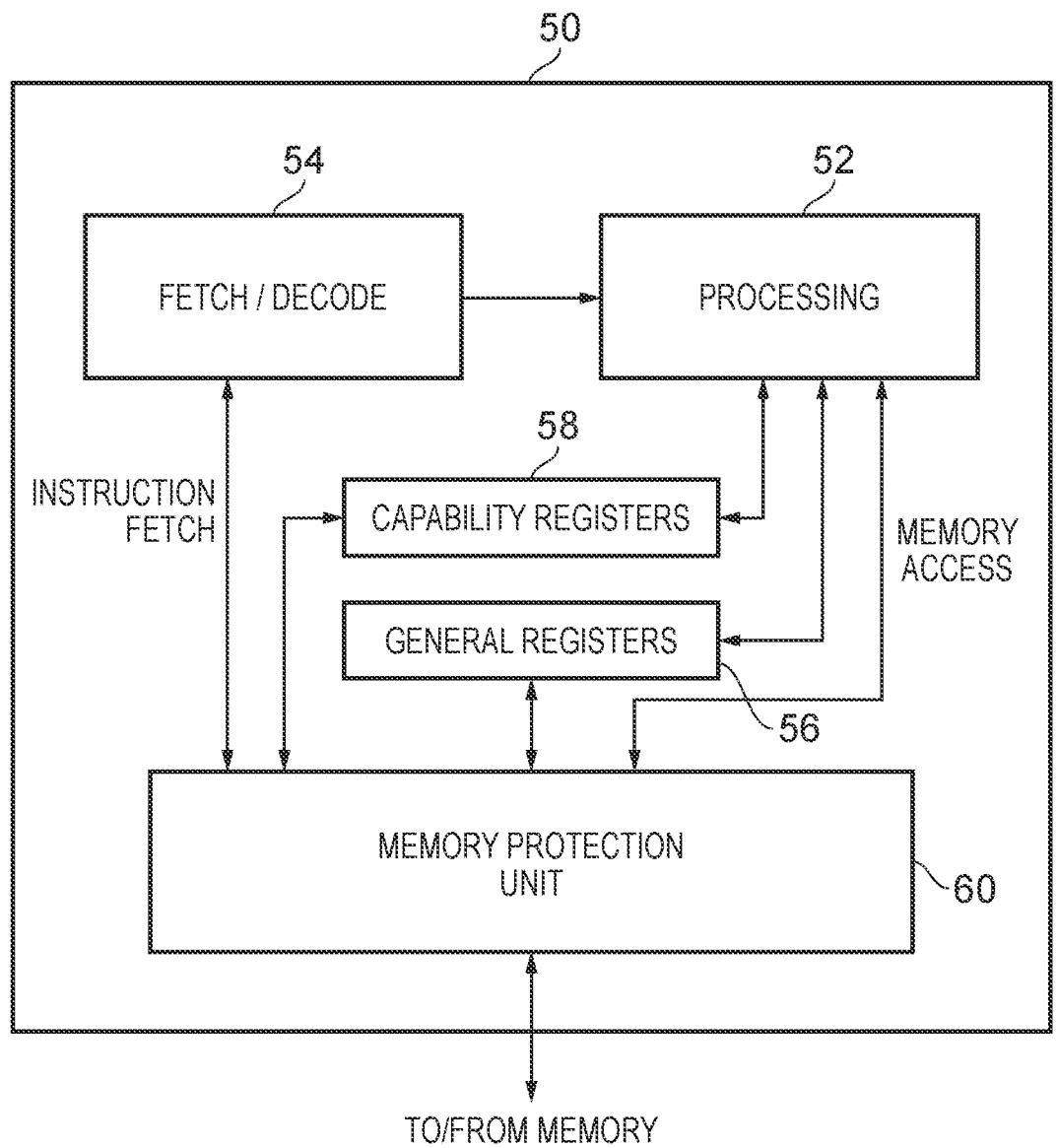
FIG. 4A schematically illustrates an apparatus in accordance with example embodiments.
FIG. 4B schematically illustrates a memory region range specifier in accordance with example embodiments.

FIG. 4 schematically illustrates an apparatus 50 in some embodiments. Here it will be appreciated that a more complete data processing system is schematically illustrated, which comprises processing circuitry 52 which is supplied with a sequence of instructions to execute by fetch/decode circuitry 54. The instructions are retrieved from a memory (not explicitly illustrated). Further, the data processing operations carried out by the processing circuitry 52 in accordance with those instructions comprises memory accesses (for example loading data values into local registers to be the subject of data processing operations, before modified data values are written back to be stored in specified memory locations). As shown in FIG. 4, the apparatus 50 comprises two types of local registers, namely general purpose registers 56 and capability registers 58. The apparatus 50 is further shown to comprise a memory protection unit 60 which lies on the memory access path for all memory accesses generated by the apparatus 50. The memory protection unit 60 may be configured in accordance with any of the examples of filtering circuitry apparatus described herein (for example with reference to FIGS. 1A, 2A, and 3). As such the memory protection unit 60 performs memory access filtering operations with respect to the memory accesses which must pass through it. These memory accesses are each compared by the memory protection unit 60 with attribute data defined for the memory region within which each memory access lies. In the example of FIG. 4A the memory region range definition register is provided as a capability register, provided as one of the capability registers 58. The processing circuitry 52 uses the capability registers 58 for the storage of capability pointers. Moreover the decode circuitry 54 is arranged to recognise a number of capability-related instructions amongst the sequence of instructions to executed by the processing circuitry 52. These capability-related instructions enable the processing circuitry 52 to both efficiently and securely handle the content of the capability registers 58. Various capability specific instructions may be defined, for example one such instruction is arranged to generate capability pointers in a format suitable for storage in the capability registers 58. The apparatus 50 can thus be programmed by the use of this instruction to create a memory range specifier in a format suitable for the memory region range definition register (as a capability register).

FIG. 4B schematically illustrates the configuration of a memory region range specifier in some embodiments, such as may be used in the example apparatus of FIG. 4A. In such an embodiment the specifier is formed as a capability pointer and is stored one of the capability registers 58. This example 32-bit specifier comprises the following parts:

permission data ([31:29])
metadata ([28:22])
shareability ([21:20])
access permissions ([19:18])
execute never flag ([17])
interpretation marker ([16])
interpretation marker ([15])
range definition data ([14:9])
range definition data ([8:0])

where the lower four parts of the specifier together comprise the definitions of the significand and the exponent of the defined range. Further, it is to be noted that the significand and the exponent, as in the example of FIG. 4B, need not be stored as two individual, distinct data items in the specifier, but rather the information defining the significand and the exponent can be stored in a more distributed, mixed format. This provides further flexibility in the use of the limited bit space of the specifier, wherein the two interpretation markers inform how the two sets of range definition data need to be interpreted. It is also to be noted that in this 32-bit format the metadata bits ([28:22]) were previously not available with the use of conventional memory region specifiers (a pair of specifiers explicitly defining a lower (base) and upper (limit) memory address for a given memory region definition). These 7 bits can therefore be made available by the present techniques for encoding of further attribute data associated with the defined memory region.

Figure 5A:
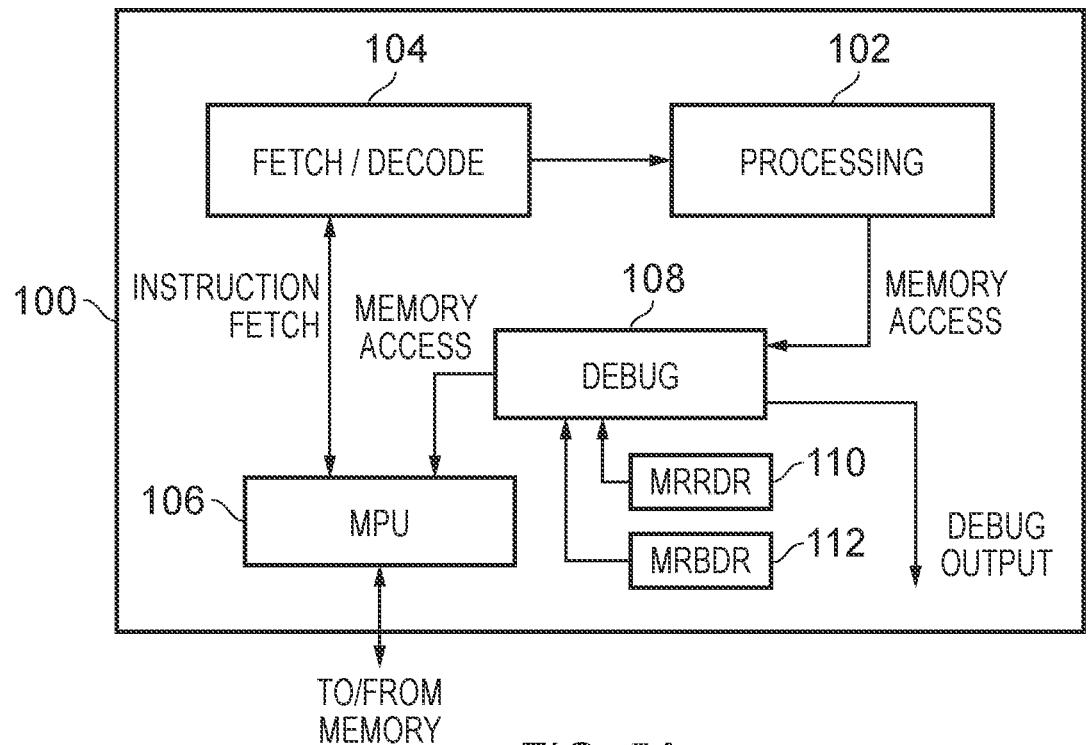
FIG. 5A schematically illustrates an apparatus in accordance with example embodiments.

FIG. 5A schematically illustrates an apparatus 100 in accordance with some example embodiments. As in the case of the example of FIG. 4, the apparatus comprises processing circuitry 102 which is supplied with a sequence of instructions to execute by fetch/decode circuitry 104. The instructions are retrieved from a memory (not explicitly illustrated). Further, the data processing operations carried out by the processing circuitry 102 in accordance with those instructions comprises memory accesses (for example loading data values into local registers to be the subject of data processing operations, before modified data values are written back to be stored in specified memory locations). In the example of FIG. 5A, the apparatus 100 comprises a memory protection unit 106, which lies on the memory access path for all memory accesses generated by the apparatus 100. Also shown is debug circuitry 108, which monitors all memory accesses generated by the instruction processing actions of the processing circuitry 102. The debug circuitry 108 may be configured in accordance with any of the examples of filtering circuitry apparatus described herein (for example with reference to FIGS. 1A, 2A, and 3). As such the debug circuitry 108 performs memory access filtering operations with respect to the memory accesses which must pass through it. The operations of the debug circuitry 108 are configured by the content of the memory region range definition register (MRRDR) 110 and the memory region base definition register (MRBDR) 112. Thus for each memory access transaction which the debug circuitry 108 monitors, it determines whether the memory address which is the subject of the memory access lies within the memory region defined by the content of the MRRDR 110 and the MRBDR 112. The debug circuitry 108 is arranged to generate debug output in dependence on the memory accesses it observes, and in particular for those memory accesses which are with respect to memory addresses within the memory region defined by the content of the MRRDR 110 and the MRBDR 112. The attribute data associated with the memory region further configures the debug output generated by the debug circuitry 108. For example, more detailed debug output may be generated with respect to certain sets of memory addresses and/or when certain processes are the source of the memory access. The debug output may be further handled in various ways, for example written to a local buffer, or written to separate storage for subsequent analysis.

Figure 5B:
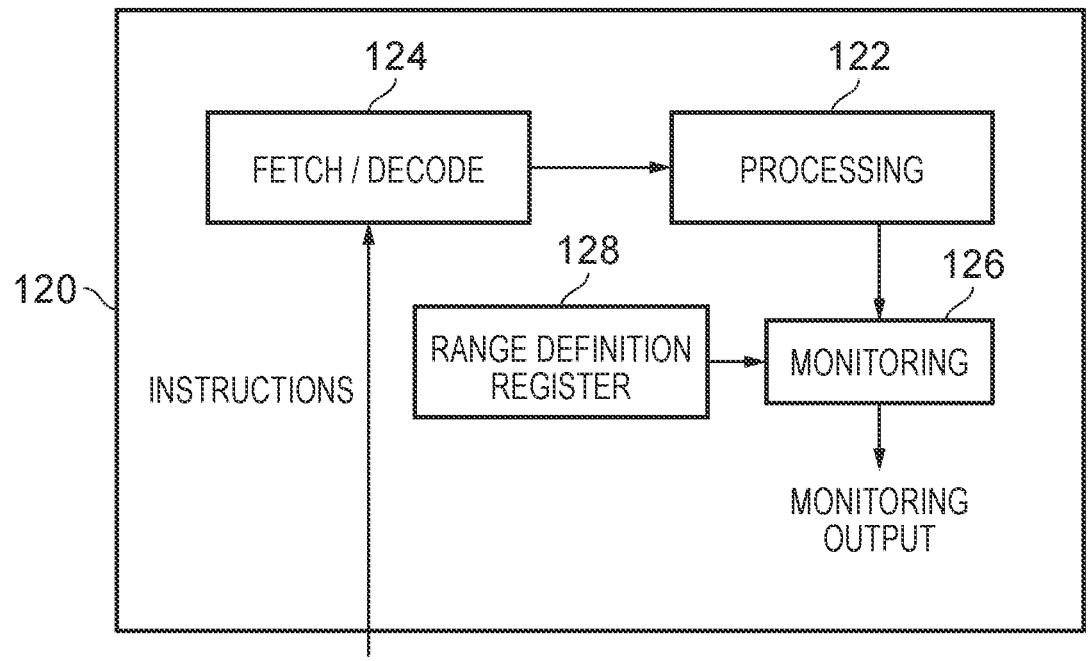
FIG. 5B schematically illustrates an apparatus in accordance with example embodiments.

FIG. 5B schematically illustrates an apparatus 120 in accordance with some example embodiments. The apparatus comprises processing circuitry 122 which is supplied with a sequence of instructions to execute by fetch/decode circuitry 124. The instructions are retrieved from a memory (not explicitly illustrated). In this example monitoring circuitry 126 is associated with the processing circuitry 122 and is configured to monitor certain transactions which form part of the data processing operations of the processing circuitry 122. Generally, these could be memory access transactions (as in the example of FIG. 5A), but they may also be any other transaction observable as part of the data processing operations. The monitoring circuitry 126 may be configured in accordance with any of the examples of filtering circuitry apparatus described herein (for example with reference to FIGS. 1A, 2A, and 3). In the example shown in FIG. 5B, only a range definition register 128 is provided and the monitoring circuitry 126 uses a predefined base value. In this example the monitoring circuitry 126 filters the transactions it observes in the processing circuitry 122 for those transactions which reference data values falling within the range defined by the content of the range definition register 128. For these transactions monitoring output is generated, with the content of that output dependent on the attribute data associated with the defined range. The monitoring circuitry 126 of FIG. 5B may therefore be embodied as trace circuitry, monitoring the data processing being performed by the processing circuitry 122, with the monitoring output taking the form of a trace stream, which may be stored in trace buffer in the apparatus for later retrieval or directly exported from the apparatus for analysis. In other examples represented by FIG. 5B, the monitoring circuitry may take the form of watchpoint circuitry and the filtering operations with respect to the specified transaction comprise watchpoint operations, for example to suspend instruction execution when a memory address within a range defined by the range definition register 128 is accessed.

Figure 6:
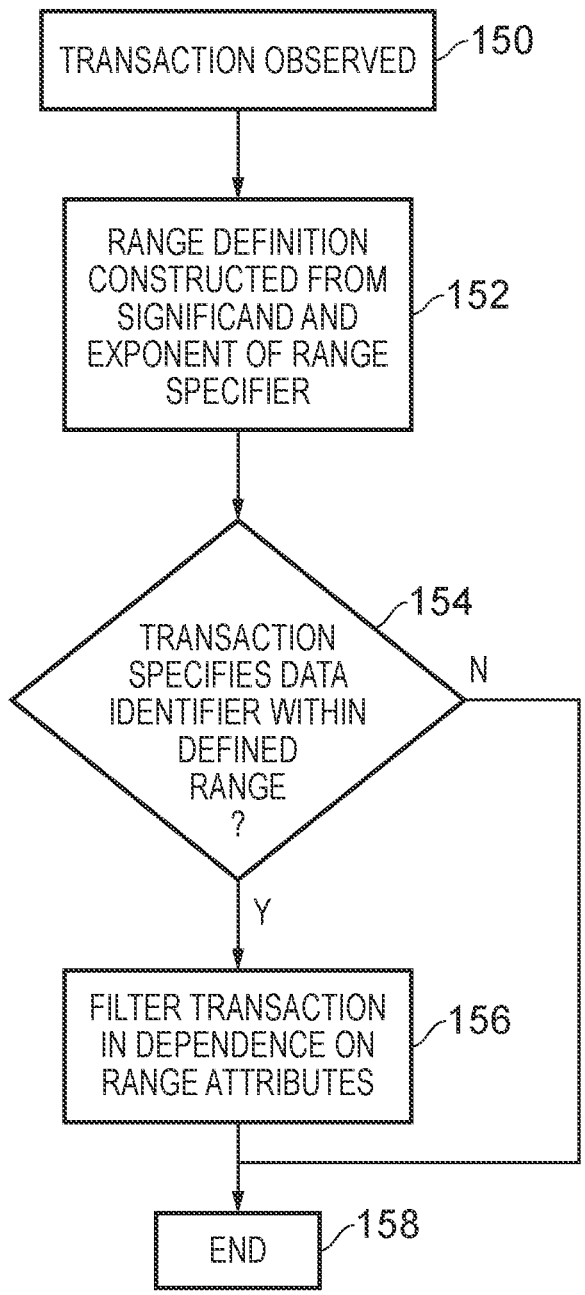
FIG. 6 shows a sequence of steps which are taken in the method of example embodiments.

FIG. 6 shows a sequence of steps which are taken in the method of example embodiments when handling an observed transaction. The observation of the transaction at step 150 initiates the flow of steps. At step 152 a range definition is constructed from the significand and exponent of a range specifier. It should be noted that in examples where the range definition is not varying (at least temporarily) the range construction of step 152 need only be performed once with reference to the range specifier and the defined range can then be locally held. At step 154 it is determined if the observed transaction specifies a data identifier which is within the range defined by the range specifier. If it does not then the flow ends at step 158. For observed transactions which do specify a data identifier within the range defined by the range specifier, at step 156 filtering operations with respect to that transaction are carried out in dependence on attribute data associated with the range. The flow then ends at step 158.

Figure 7:
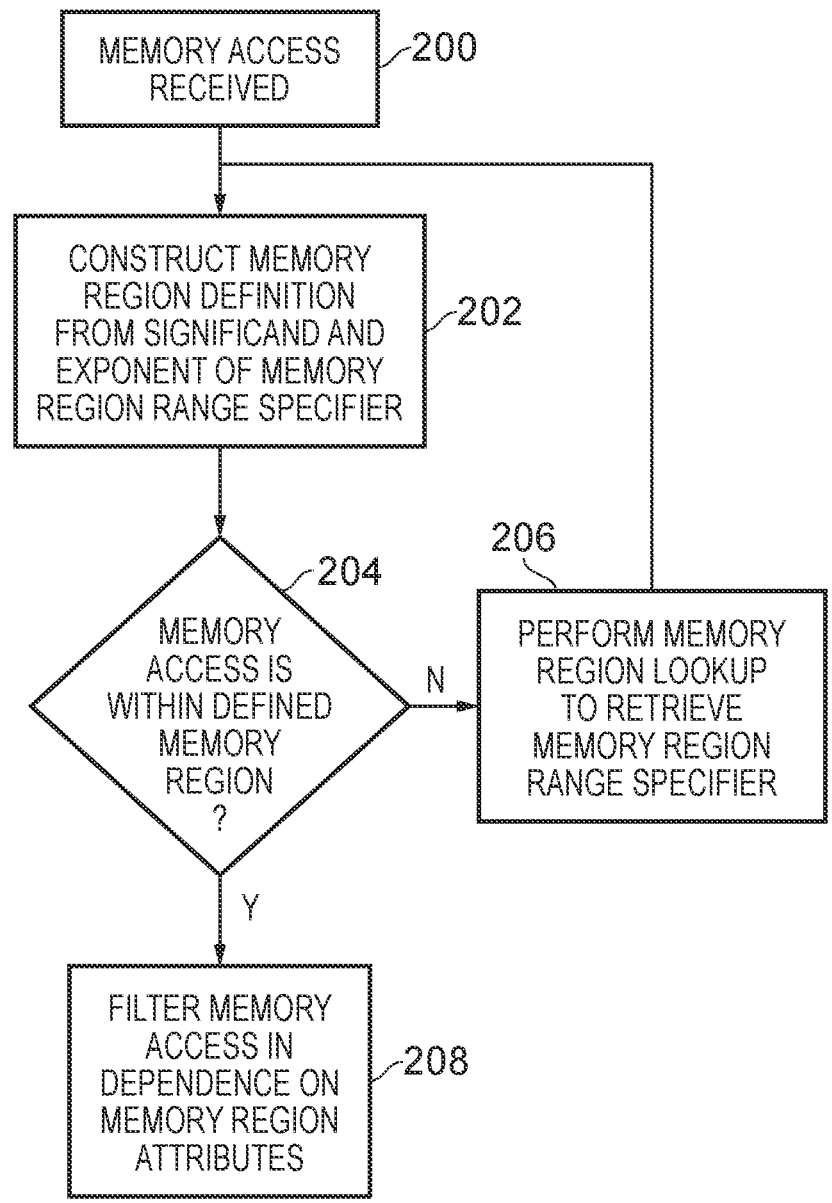
FIG. 7 shows a sequence of steps which are taken in the method of example embodiments.

FIG. 7 shows a sequence of steps which are taken in the method of example embodiments in which memory access transactions are observed. For example the memory protection unit 60 in the example of FIG. 4A may carry out such a sequence of steps in some implementations. The receipt of a memory transaction at step 200 initiates the flow of steps. At step 202 a memory region range definition is constructed from the significand and exponent of a memory region range specifier. As in the case of FIG. 6, the memory region range definition need only be constructed once with reference to the memory region range specifier and the defined range can then be locally held for further use. At step 204 it is determined if the observed memory access specifies a memory address which is within the memory region defined. If it does not then the flow proceeds to step 206, where a memory region lookup procedure is carried out in order to retrieve the memory region range specifier required for the memory access being handled. The flow then returns to step 202 for the replacement memory region range definition to constructed from the significand and exponent of the new memory region range specifier. When, at step 204, it is determined that the observed memory access does specify a memory address which is within the memory region defined, the flow proceeds to step 208, where the memory access is filtered in dependence on attribute data associated with the defined memory region. A range of filtering operations are possible, for example blocking the memory access entirely, if it is not permitted, or merely modifying certain related aspects of the memory access, such as whether the data it retrieves may be cached or not.

Figure 8:
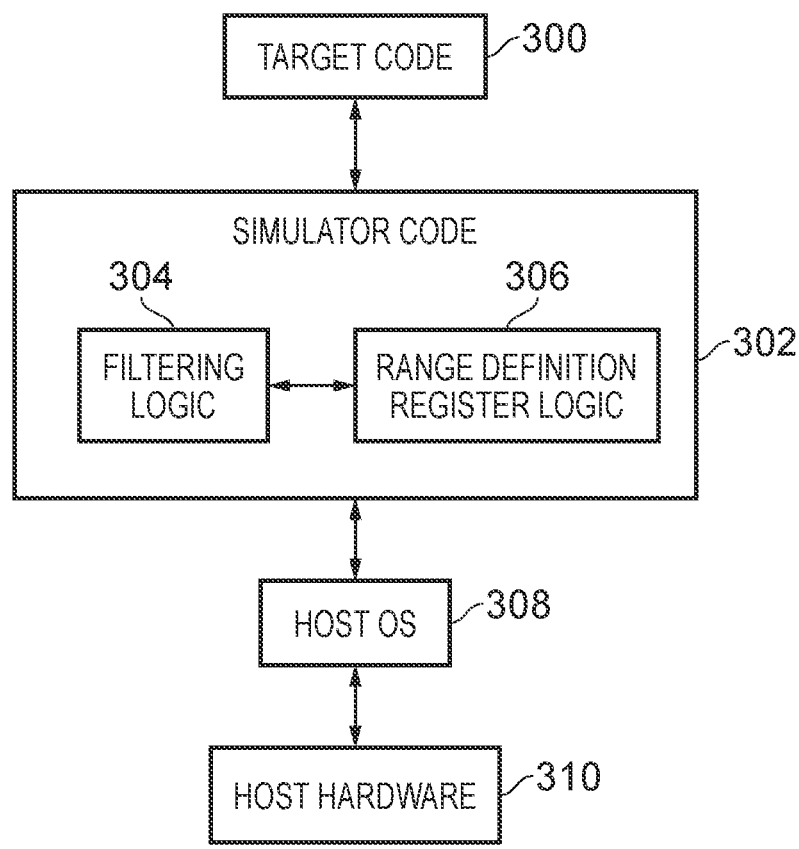
FIG. 8 schematically illustrates a simulator implementation of example embodiments.

FIG. 8 schematically illustrates a simulator implementation of example embodiments. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 310, optionally running a host operating system 308, supporting the simulator program 302. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 310), some simulated embodiments may make use of the host hardware, where suitable.

The simulator program 302 may be stored on a computer-readable storage medium (which may be a non-transitory medium), and provides a program interface (instruction execution environment) to the target code 300 (which may include applications, operating systems and a hypervisor) which is the same as the interface of the hardware architecture being modelled by the simulator program 302. Thus, the program instructions of the target code 300 may be executed from within the instruction execution environment using the simulator program 302, so that a host computer 310 which does not actually have the hardware features of the apparatuses described above (for example those shown in FIGS. 1A, 2A, 3A, 4A, 5A, and 5B) can emulate these features by the provision of filtering logic 304 and range definition register logic 306 forming part of the simulator program 302.

In brief overall summary data processing apparatuses, methods and computer programs are disclosed. A range definition register is arranged to store a range specifier and filtering operations are performed with respect to a specified transaction by reference to the range definition register. The range definition register stores the range specifier in a format comprising a significand and an exponent, wherein a range of data identifiers is at least partially defined by the range specifier. When the specified transaction is with respect to a data identifier within the range of data identifiers, the filtering operations performed are dependent on attribute data associated with the range of data identifiers.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. A data processing apparatus comprising:
   a range definition register arranged to store a range specifier; and
   filtering circuitry to perform filtering operations with respect to a specified transaction by reference to the range definition register,
   wherein:
   the range definition register is arranged to store the range specifier in a format comprising a significand and an exponent, wherein a range of data identifiers is at least partially defined by the range specifier;
   when the specified transaction is with respect to a data identifier within the range of data identifiers, the filtering operations performed by the filtering circuitry are dependent on attribute data associated with the range of data identifiers;
   the range definition register is a memory region range definition register and the range specifier is a memory region range specifier;
   the range of data identifiers is a memory region at least partially defined by the memory region range specifier; and when the memory region does not correspond to the specified transaction, the filtering circuitry is arranged to perform a memory region specifier lookup procedure to seek to retrieve replacement content for the memory region range definition register.

2. The data processing apparatus as claimed in claim 1, wherein the range specifier further comprises at least some of the attribute data.

3. The data processing apparatus as claimed in claim 1, further comprising a base definition register arranged to store a base specifier, wherein the range of data identifiers comprises a set of data identifiers ranging between a first data identifier indicated by the base specifier and a second data identifier dependent on the first data identifier and a data identifier range indicated by the range specifier.

4. The data processing apparatus as claimed in claim 3, wherein the base specifier further comprises at least some of the attribute data.

5. The data processing apparatus as claimed in claim 1, further comprising a memory region base definition register arranged to store a memory region base specifier, wherein the memory region comprises a set of memory addresses ranging between a first address indicated by the memory region base specifier and a second address dependent on the first address and a memory range indicated by the memory region range specifier.

6. The data processing apparatus as claimed in claim 5, wherein the memory region specifier lookup procedure comprises seeking to retrieve replacement content for the memory region base definition register corresponding to the specified transaction.

7. The data processing apparatus as claimed in claim 6, wherein performing the memory region specifier lookup procedure comprises performing a table walk with respect to a table of memory region specifiers stored in memory,
wherein the table walk is a converging iterative process comprising examination of a sequence of candidate memory region base specifiers, wherein at each iteration of the converging iterative process a comparison is made between a candidate memory region base specifier and the memory address of the specified transaction, wherein for a subsequent iteration of the converging iterative process the candidate memory region base specifier is dependent on a result of the comparison in a preceding iteration of the converging iterative process.

8. The data processing apparatus as claimed in claim 7, wherein the table walk further comprises a verification step performed after the converging iterative process to determine whether the candidate memory region base specifier of a final iteration of the converging iterative process and a candidate memory range indicated by a candidate memory region range specifier define a candidate memory region comprising the memory address of the specified transaction.

9. The data processing apparatus as claimed in claim 7, wherein the first step of each iteration of the converging iterative process comprises fetching the candidate memory region base specifier and the candidate memory region range specifier from the table in memory,
and, when the second step of each iteration is performed, the second step of each iteration is performed contemporaneously with a next first step of a next iteration of the converging iterative process comprising fetching a next candidate memory region base specifier and a next candidate memory region range specifier from the table in memory.

10. The data processing apparatus as claimed in claim 6, wherein performing the memory region specifier lookup procedure comprises performing a table walk with respect to a table of memory region specifiers stored in memory,
wherein the table walk is a converging iterative process comprising examination of a sequence of candidate memory region base specifiers, wherein in a first step of each iteration of the converging iterative process a candidate first address is determined from each candidate memory region base specifier and, when the candidate first address represents a boundary of a candidate memory region which is compatible with the specified transaction, a second step of each iteration is performed to determine whether the candidate first address and a candidate memory range indicated by a candidate memory region range specifier define a candidate memory region comprising the memory address of the specified transaction.

11. The data processing apparatus as claimed in claim 1, wherein the range definition register is a data value range definition register and the range specifier is a data value range specifier,
and wherein the range of data identifiers is a range of data values at least partially defined by the data value range specifier.

12. The data processing apparatus as claimed in claim 1, further comprising:
processing circuitry to perform data processing operations;
at least one capability register arranged to store at least one capability pointer;
decode circuitry responsive to a sequence of instructions to generate control signals for the processing circuitry to cause the processing circuitry to perform the data processing operations in accordance with the sequence of instructions,
wherein the data processing instructions comprise at least one capability pointer processing instruction, wherein in response to the at least one capability pointer processing instruction specifying the at least one capability register the processing circuitry performs at least one capability pointer specific data processing operation with respect to the at least one capability register, and
wherein the range definition register is a capability register.

13. The data processing apparatus as claimed in claim 12, wherein the data processing instructions comprise a capability pointer generating instruction, wherein the decode circuitry is responsive to the capability pointer generating instruction, when the capability pointer generating instruction specifies the range definition register as a destination register, to cause the processing circuitry to generate the range specifier.

14. The data processing apparatus as claimed in claim 1, wherein the filtering circuitry is memory protection circuitry and the filtering operations with respect to the specified transaction comprise preventing the specified transaction from accessing the memory address when the attribute data associated with the memory region indicate that access to the memory address is forbidden.

15. The data processing apparatus as claimed in claim 1, wherein the filtering circuitry is monitoring circuitry and the filtering operations with respect to the specified transaction comprise generating a notification when the attribute data associated with the memory region indicate that access to the memory address is to be subject to monitoring actions.

16. The data processing apparatus as claimed in claim 15, wherein the monitoring circuitry is debug circuitry and the filtering operations with respect to the specified transaction comprise debug operations.

17. The data processing apparatus as claimed in claim 15, wherein the monitoring circuitry is trace circuitry and the filtering operations with respect to the specified transaction comprise tracing operations.

18. The data processing apparatus as claimed in claim 15, wherein the monitoring circuitry is watchpoint circuitry and the filtering operations with respect to the specified transaction comprise watchpoint operations.

19. A method comprising:
storing a range specifier in a range definition register;
performing filtering operations with respect to a specified transaction by reference to the range definition register,
wherein the range definition register is arranged to store the range specifier in a format comprising a significand and an exponent, wherein a range of data identifiers is at least partially defined by the range specifier;
when the specified transaction is with respect to a data identifier within the range of data identifiers, modifying the filtering operations in dependence on attribute data associated with the range of data identifiers,
wherein the range definition register is a memory region range definition register and the range specifier is a memory region range specifier, and
wherein the range of data identifiers is a memory region at least partially defined by the memory region range specifier; and
in response to the memory region not corresponding to the specified transaction, performing a memory region specifier lookup procedure to seek to retrieve replacement content for the memory region range definition register.

20. A non-transitory, computer-readable storage medium storing a computer program for controlling a host data processing apparatus to provide an instruction execution environment comprising:
range definition register logic arranged to store a range specifier; and
filtering logic to perform filtering operations with respect to a specified transaction by reference to the range definition register logic,
wherein:
the range definition register logic is arranged to store the range specifier in a format comprising a significand and an exponent, wherein a range of data identifiers is at least partially defined by the range specifier;
when the specified transaction is with respect to a data identifier within the range of data identifiers, the filtering operations performed by the filtering logic are dependent on attribute data associated with the range of data identifiers;
the range definition register is a memory region range definition register and the range specifier is a memory region range specifier;
the range of data identifiers is a memory region at least partially defined by the memory region range specifier; and
when the memory region does not correspond to the specified transaction, the filtering logic is arranged to perform a memory region specifier lookup procedure to seek to retrieve replacement content for the memory region range definition register.

* * * * *